United States Patent [19]

Ommori et al.

[11] Patent Number: 4,785,369
[45] Date of Patent: Nov. 15, 1988

[54] SHUTTER FOR MAGNETIC DISK CARTRIDGE

[75] Inventors: Shozo Ommori; Kengo Oishi, both of Odawara, Japan

[73] Assignee: Fuji Photo Film Co., Ltd., Japan

[21] Appl. No.: 117,932

[22] Filed: Nov. 3, 1987

Related U.S. Application Data

[63] Continuation of Ser. No. 731,105, May 6, 1985, abandoned.

[30] Foreign Application Priority Data

Jun. 1, 1984 [JP] Japan .............................. 59-81443[U]

[51] Int. Cl.$^4$ ............................................. G11B 23/03
[52] U.S. Cl. ................................................... 360/133
[58] Field of Search .................. 360/133, 99, 97; 206/444; 369/289, 291

[56] References Cited

U.S. PATENT DOCUMENTS 4,589,105 5/1986 Nemoto et al. .................... 360/133

FOREIGN PATENT DOCUMENTS 144974 6/1985 European Pat. Off. ............. 360/97

Primary Examiner—John H. Wolff
Assistant Examiner—Matthew J. Bussan
Attorney, Agent, or Firm—Pasquale A. Razzano

[57] ABSTRACT

A sliding shutter for a magnetic disk cartridge is disclosed which includes an engaging member positioned to contact a torsion spring in the cartridge during the process of fitting the shutter onto the cartridge. The engaging member acts to guide the spring to the proper position for engagement and has an angled face to facilitate the movement of the spring into engagement in a notch in the engaging member. This also reduces the rate of product rejects caused by springs which are mis-positioned during the assembly process.

1 Claim, 2 Drawing Sheets

SHUTTER FOR MAGNETIC DISK CARTRIDGE

This application is a continuation of application Ser. No. 06/731,105, filed May 6, 1985, now abandoned.

BACKGROUND OF THE INVENTION

1. Field of the Invention

This invention relates to a shutter for opening/closing the head access window of a magnetic disk cartridge. More particularly, this invention relates to an improved engagement means for the shutter.

2. Description of the Prior Art

In recent years development is moving ahead of magnetic disk cartridges consisting of a thin, small-diameter disk of magnetic recording media housed rotatably in a casing. These magnetic disk cartridges are provided with a magnetic head access window through which the recording media can be exposed for access by a magnetic head when the cartridge is being used. The casing is provided with a shutter for use with magnetic disk cartridges which can be slid to open the head access window for when the cartridge is being used or to close the window when the cartridge is not being used. This shutter is provided with an opening of the same shape as that of the head access window, and when the cartridge is in use this opening is positioned over the head access window to expose the magnetic recording media, and when the cartridge is not in use the opening is in a position of non-alignment with the window, so that the window is covered by the surface of the shutter. The shutter is provided with an engaging member which has a notch portion for engaging with an engaging portion of a torsion spring provided in the casing, and when the cartridge is not in use the force of the torsion spring pressing on the shutter keeps it in the position where the opening is not in alignment with the head access window. When the cartridge is in use an external mechanism in which the cartridge is provided acts to bend the torsion spring and move the shutter to bring the opening into alignment over the head access window so as to enable the cartridge to be used. However, in fitting the shutter to the cartridge, the notch portion thereof has to engage with the engaging portion of the torsion spring. Therefore, the engaging portion of the torsion spring has to have the same orientation as the axis of rotation of the magnetic recording media, and the surface of the engaging member of the shutter which comes into contact with the engaging portion acts to guide the engaging portion into the position of engagement in the notch portion. However, because the conventional guide portion forms a flat plane which is perpendicular with reference to the direction of sliding movement of the shutter, there is a large amount of resistance which makes it difficult for the engaging portion of the torsion spring to be guided securely into the notch portion, and there is even a risk of the engaging portion being deflected into the empty space on the opposite side to the notch portion. Also, it sometimes happens that the press-forming process imparts a slight projection or outward curvature to the guide portion, and this has made the said deflection more likely to occur. Because it is difficult to return a spring thus deflected to its correct position, such deflection has had a direct affect on the product yield. In assembly operations using the above construction, the rate of such faulty spring location is about 0.3%.

SUMMARY OF THE INVENTION

The object of the present invention is therefore to provide a magnetic disk cartridge shutter with means for securely engaging the engaging portion of the torsion spring when the shutter is fitted to the cartridge, thereby improving the product yield. The magnetic disk cartridge shutter of the present invention is characterized by the guide portion of the engaging member being slanted so that when during the assembly process the shutter is being fitted to the magnetic disk cartridge the engaging portion of the torsion spring is guided securely into the notch portion of the said engaging member. Here, by slanted is meant that the surface of the guide portion is angled so as to be nearly parallel to the direction from which the engaging portion of the torsion spring makes contact and is guided, so that by application of a smaller amount of force on the spring than is the case with the conventional type, merely flexing the spring, the reactive force of the spring acts to guide the engaging portion of the spring along the guide portion to the notch portion.

In a magnetic disk cartridge shutter thus formed in accordance with the present invention, by providing the engaging member of the shutter with a slanting guide portion, the engaging portion of the torsion spring can be easily guided to and moved along the guide portion for engagement with the notch portion, so the possibility of the engaging portion deflecting off in the opposite direction is extremely small compared with the conventional type. The probability of the spring slipping off during the assembly of a magnetic disk cartridge using the shutter of the present invention is no more than 0.03%, which is far lower than the conventional 0.3%. And, again compared to the conventional type, less force is applied to the spring, as it only has to be flexed upon insertion to facilitate its engagement with the guide portion, thereby enabling the efficiency of the assembly operation to be increased.

DESCRIPTION OF THE PREFERRED EMBODIMENTS

The present invention will now be described with reference to the accompanying drawings.

Figure 1:
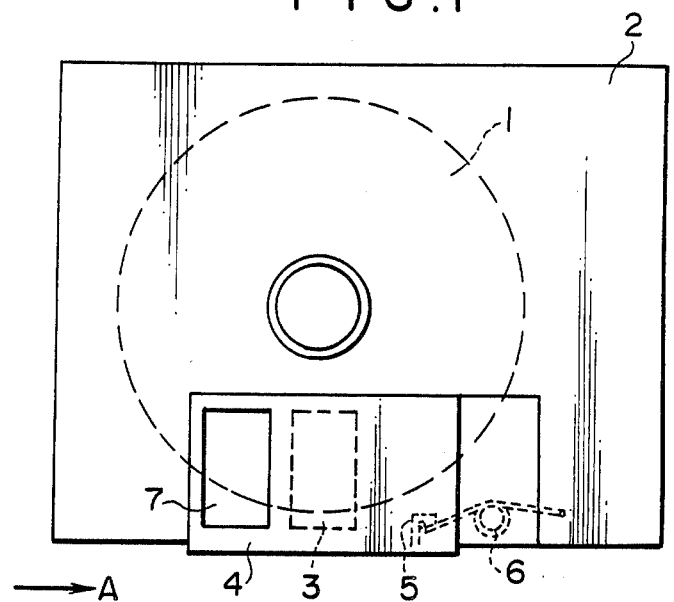
FIG. 1 is an overall plane view of the parts of a magnetic disk cartridge employing a shutter according to the present invention.

In FIG. 1, a disk-shaped magnetic media 1 is rotatably housed in a casing 2 which is provided on its upper and lower surfaces with a head access window 3 for exposing a portion of the magnetic medium 1 for access by a magnetic head when the cartridge is in use. In FIG. 1 the cartridge is shown when it is not being used, the head access window 3 being covered by the shutter 4, the upper and lower surfaces, which include said head access windows, and part of the side of which are in contact with the casing to permit a sliding motion of the shutter. The shutter 4 has an engaging member 5 parallel to the plane of the magnetic medium 1 inside the casing 2 and which is urged by the engagement with a torsion spring 6, also provided within the casing, into the above position. The shutter 4 is provided with an opening 7 of the same shape as that of the head access window and positioned so as to be over the head access window 3 when the shutter 4 is slid in the direction of the arrow A. When the cartridge is in use an external means within which the cartridge is provided acts to slide the shutter 4 in the direction and hold the opening 7 in alignment over the head access window 3, exposing the magnetic recording medium 1 for access by a magnetic head.

Figure 2:
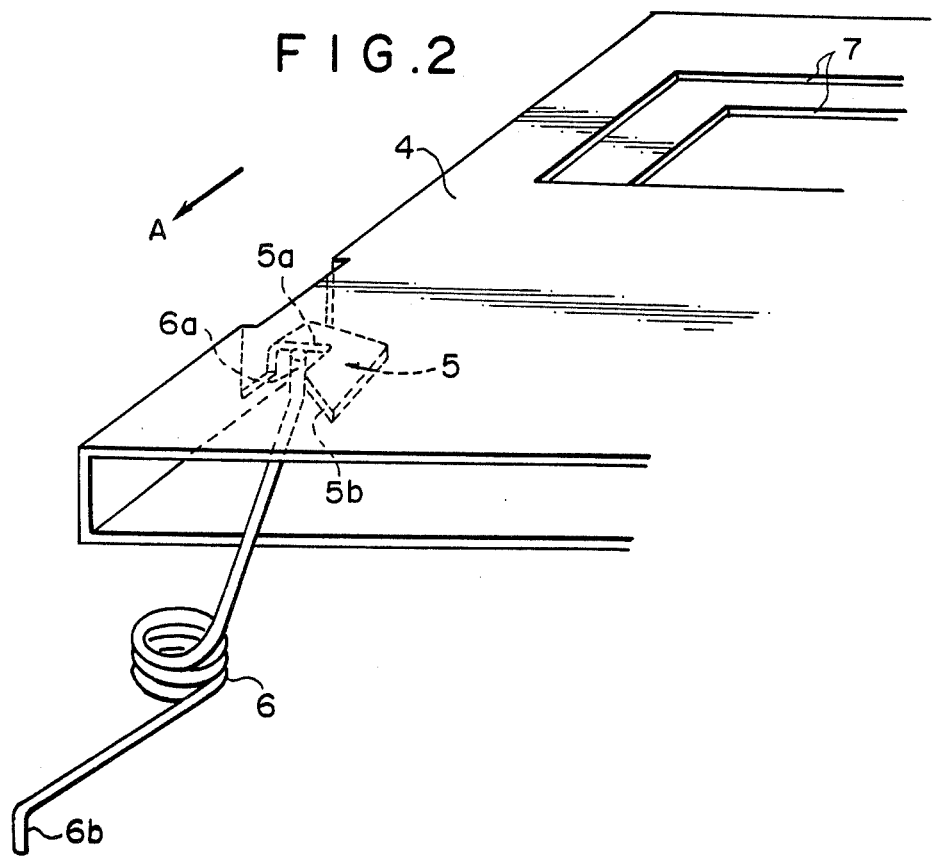
FIG. 2 is a perspective view showing the construction of the principal parts of the shutter and torsion spring in accordance with the present invention.

The engagement of the engaging member of the shutter with the torsion spring will now be described with reference to FIGS. 2 and 3.

One end of the torsion spring 6 is provided with a pivot 6b which is affixed to the inner wall (not shown) of the cartridge; when force is applied to the engaging portion 6a provided on the other end of the spring, the spring moves within the case, flexing to form a V with the round portion at the center of the spring as the base of the V.

Figure 3:
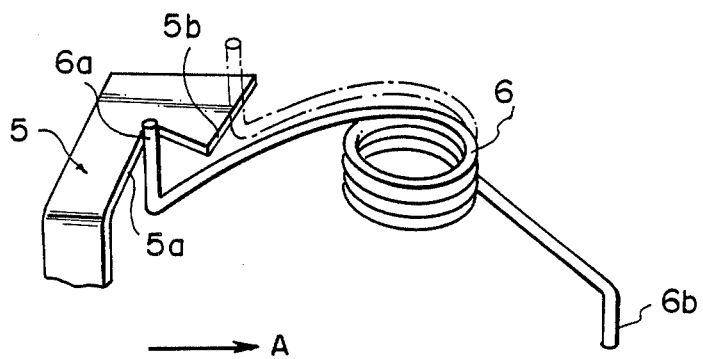
FIG. 3 is a perspective view of the relationship between the engaging member of the shutter and the torsion spring.
Figure 4:
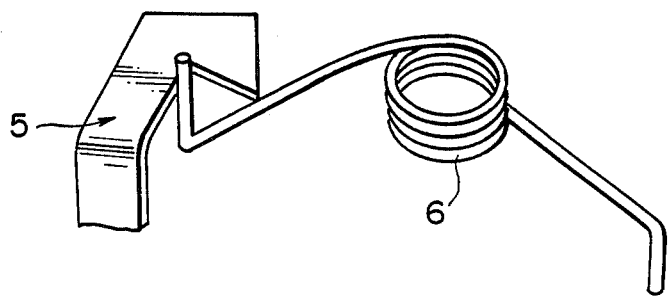
FIG. 4 is a perspective view of a conventional shutter showing the construction of the same parts shown in FIG. 3.

In the assembly of the cartridge, when the shutter 4 is slid in the direction of the arrow A the engaging portion 6a first comes into contact with the edge of the guide portion 5b of the engaging member 5 provided on the shutter 4, as shown in FIG. 3 by the broken line. This guide portion 5b is slanted towards the notch portion 5a of the engaging member 5 so that when the shutter is fitted into position the engaging portion 6a comes into contact with the guide portion, and as the torsion spring 6 is gradually flexed the engaging portion 6a is moved along the guide portion so that when the shutter is in place the engaging portion is in engagement with the notch portion, as shown by the solid line in the drawing.

With the magnetic disk cartridge shutter according to the present invention, because the guide portion 5b is slanted, guidance to and engagement with the notch portion is easier than it is with the conventional shutter.

We claim:

1. In a magnetic disk cartridge including a casing having a magnetic head access window, a disk shaped magnetic media rotatably housed in the casing, and a shutter adapted to be slidably mounted on the cartridge casing to selectively open and close said magnetic head access window and a torsion spring in the casing including a shutter engaging portion extending generally perpendicularly to the plane of said magnetic media, wherein the improvement comprises a guide member formed in said shutter including a notch portion for engagement with said shutter engaging portion of the torsion spring, said guide member including a guide portion extending generally parallel to the plane of said magnetic media and perpendicularly to said shutter engaging portion of the torsion spring, said guide portion being located adjacent said notch portion and positioned to engage the engaging portion of the torsion spring when the shutter is slid into the casing to guide said engaging portion of the torsion spring into the notch position, said guide portion facing said engaging portion of the spring when the shutter is slid into the casing and being slanted to incline at an angle to the sliding direction of the shutter, said engaging portion of the torsion spring engaging said guide portion when it is being fitted to the case, so as to guide said engaging portion toward said notch portion to be reliably retained by said notch portion.

* * * * *